Sept. 20, 1927.  C. STRAND  1,642,701
TIRE CHAIN FASTENER
Filed April 4, 1927
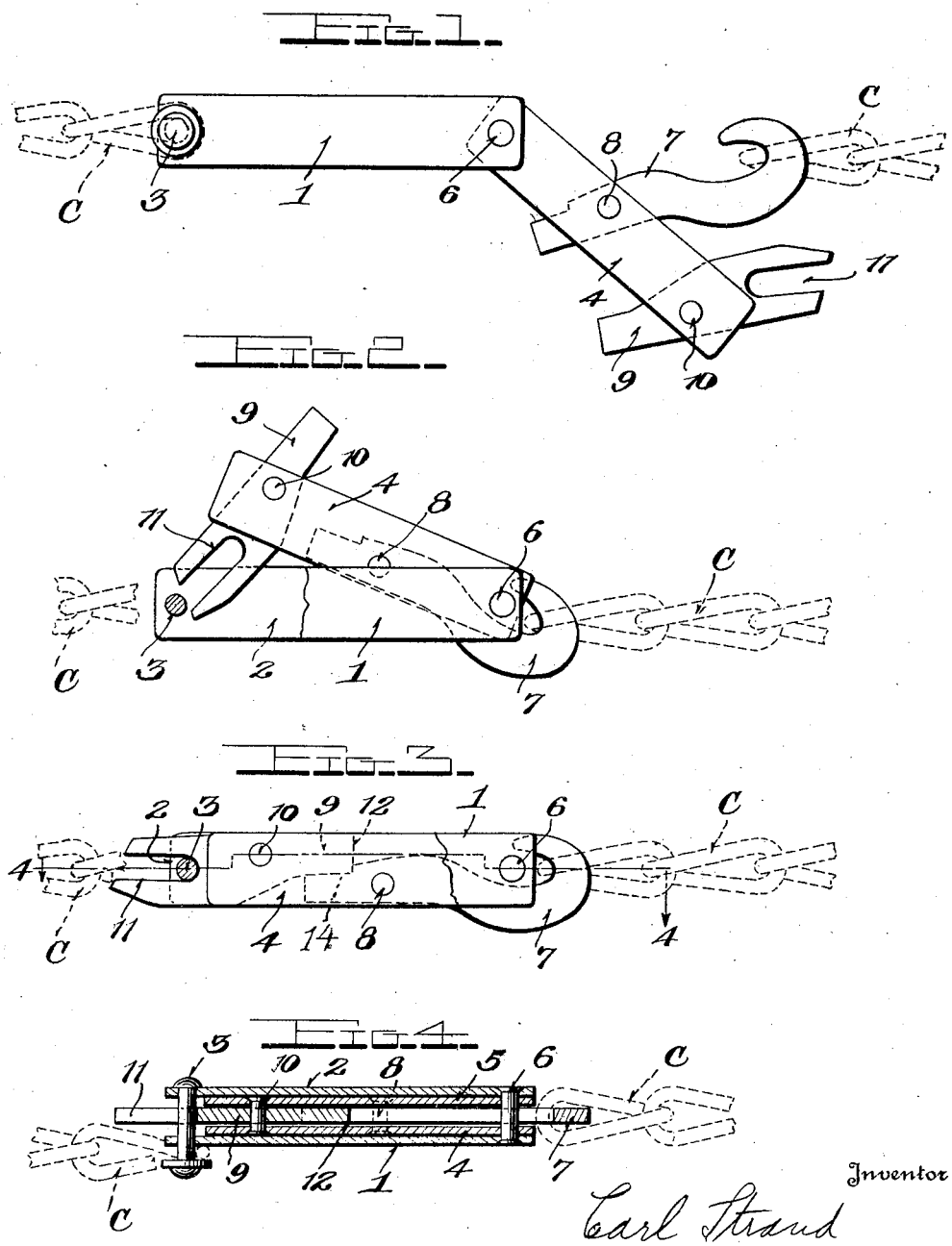
Inventor
Carl Strand
By A.W. Freeman
Attorney Patented Sept. 20, 1927.

1,642,701

UNITED STATES PATENT OFFICE.

CARL STRAND, OF MITCHELL, SOUTH DAKOTA.

TIRE-CHAIN FASTENER.

Application filed April 4, 1927. Serial No. 180,776.

This invention relates to certain new and useful improvements in tire chain fasteners and the primary object of the invention is to provide a device of this kind which can be easily and quickly operated and which affords a more effective latching of the parts so as to prevent accidental disengagement of the same.

The invention further aims to provide a device of this kind wherein the parts mutually cooperate to prevent accidental disengagement and one wherein the chain may be more easily and quickly drawn taut in applying the fastener and moving the parts to locked position.

The invention has further and other objects which will be later set forth and manifested in the course of the following description.

In the drawings:—

Fig. 1 is a side elevation of the invention with the parts at the inception of applying the fastener;

Fig. 2 is a like view partly broken away and in section showing the parts at a further stage of application;

Fig. 3 is a view similar to Fig. 2 showing the parts in latched or locked position, and Fig. 4 is a section on line 4—4 of Fig. 3.

In proceeding in accordance with the present invention a sheath is provided which is composed of spaced sides 1 and 2 connected at one end by a rivet 3, the latter being extended at one end so as to form an anchorage for one end of the chain C. A carrier composed of spaced sides 4 and 5 is pivoted by means of a rivet 6 to the opposite end of the sheath. A hook 7 is pivoted at a point intermediate its ends to and between the carrier sides and is formed to engage the opposite end of the chain C. The tail of the hook is formed with a cut-out 14 which receives the tail of the latch when the parts are in locked position. The hook is pivoted between the ends of the carrier. A latch 9 is pivoted at 10 to and between the sides of the carrier at the free end of the latter, the latch 9 being likewise pivoted between its ends and is formed with a bifurcated end 11.

From the foregoing, it will be seen that both the hook and the latch are mounted on the carrier for movement with the latter and also independently of the same.

In operation the parts are in the position of Fig. 1 with the carrier projecting forwardly of the sheath, and the hook 7 being engaged with an end of the tire chain. The carrier is now grasped by the hand and swung toward the sheath, the carrier acting as a handle and affording a means for easily moving the hook so as to tighten the chain. The parts are now swung to the position of Fig. 2, in which the carrier projects above the top of the sheath, whereupon the parts are moved downwardly and with the bifurcated end 11 receiving the rivet 3. Continued downward movement of the parts brings the same to the position of Figs. 3 and 4 wherein it will be noted that the inner ends of the hook 7 and latch 9 abut, the tail of the latch being received in the cut-out 14, the parts 7 and 9 thus being latched against movement out of the front side of the sheath. The rear side of the sheath abuts the tire casing and consequently the latter will prevent the parts moving through the rear side of the sheath to the position of Fig. 2 followed by continued movement of the parts to a point where the chain can be disengaged from the hook.

What is claimed is:—

1. In a tire chain fastener, a sheath having spaced sides open at the top and bottom thereof, a rivet connected to the sides at one end thereof and formed to engage one end of a chain, a carrier receivable between the sheath sides and having spaced sides, means to pivotally connect the carrier to the other end of the sheath, a hook pivoted between its ends to and between the carrier sides and having a notch formed in its tail, and a latch pivoted between its ends to and between the carrier sides, the latch having a bifurcated end formed to receive and engage the rivet, the tail of the latch being receivable in the notch of the hook whereby the latch and hook abut at their inner end portions in operative position of the parts so as to prevent movement of the parts out of the front side of the sheath.

2. In a tire chain fastener, a sheath having spaced sides open at the top and bottom thereof, a rivet at one end of the sheath, a carrier having spaced sides pivoted to the other end of the sheath, and a hook and a latch each pivoted between its ends to and between the carrier sides, the hook being engageable with the other end of the chain and the latch having a bifurcated front end to engage over the rivet, the inner end portions of the latch and hook being formed to abut in operative position of the parts so as to prevent movement of the parts out of the front side of the sheath.

3. In a chain fastener, a body having a transverse part at one end, a carrier pivoted to the other end of the body, and a hook and a latch each pivoted to the carrier, the latch having a bifurcated end to engage the said transverse part of the body, the latch and hook having tails formed to engage in operative position of the parts to prevent movement of the parts out of the front side of the body.

4. In a chain fastener, a body, a carrier movable to lie in the plane of the body and pivoted thereto, a hook and a latch each pivoted to the carrier and movable to lie in the plane thereof, and means carried by the body to engage the front end of the latch in operative position of the parts, the latch and hook having their rear ends free and formed to abut and prevent movement of the latch and hook out of the front side of the casing.

5. In a chain fastener, a body, a hook, means movably connected to the hook and to the body for enabling the hook to be disposed outwardly of the body so as to engage an end of a chain, said means serving as a lever for moving the hook thereby to draw the chain taut and being movable with the hook to lie adjacent to the body, and movable means carried by the first means and engageable with and disengageable from the hook to hold the parts against movement in one direction in operative position of the parts.

In testimony whereof I affix my signature.

CARL STRAND.